United States Patent Office 3,551,798
Patented Dec. 29, 1970

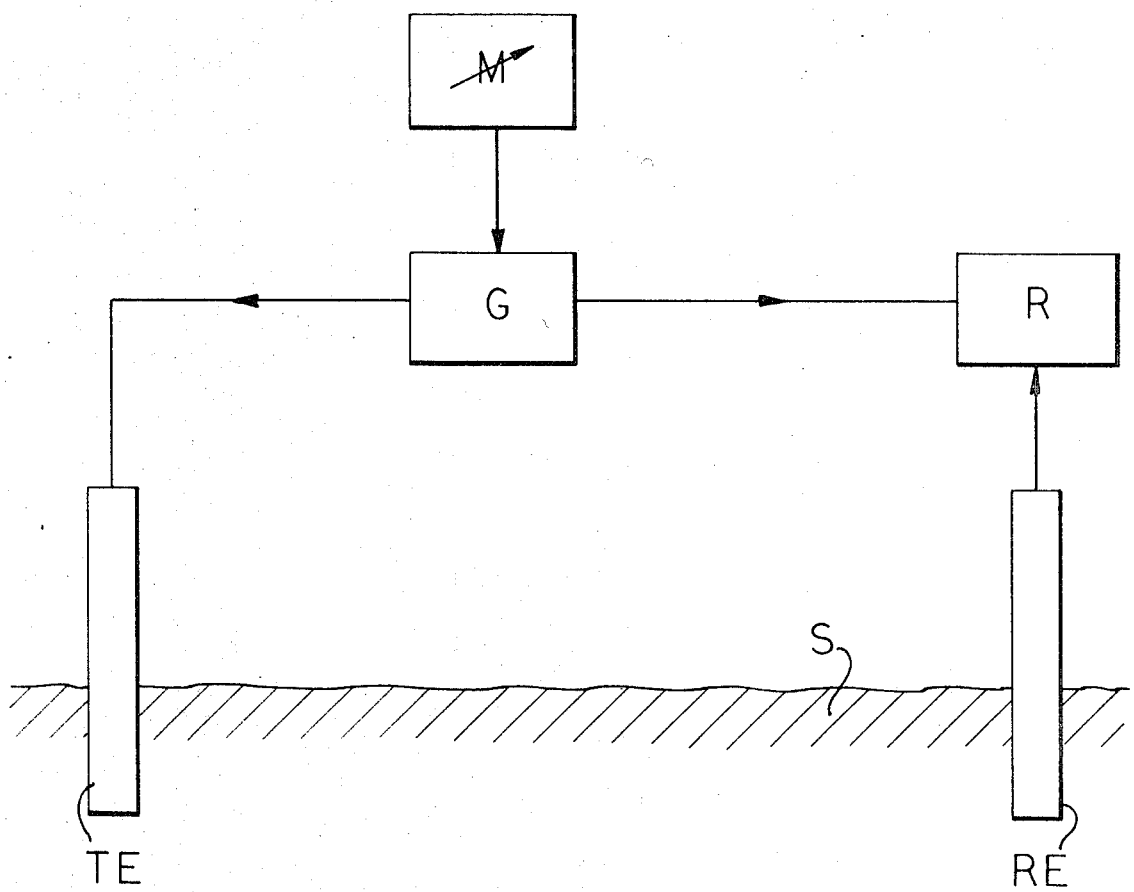

3,551,798
METHOD FOR GEOPHYSICAL EXPLORATION WITH SIGNALS CONFORMING TO AN EXPONENTIAL LAW
Boris Samoilovich Enenshtein, Alexei Petrovich Ivanov, and Anatoly Petrovich Boltalin, Moscow, and Georgy Mikhailovich Iova, Mytischi, U.S.S.R., assignors to Geologichesky Institut An U.S.S.R., Moscow, U.S.S.R.
Filed Feb. 19, 1968, Ser. No. 706,261
Int. Cl. G01v 3/12
U.S. Cl. 324—6                         1 Claim

ABSTRACT OF THE DISCLOSURE

A method of geological survey is provided according to which continuous sounding is effected by means of a signal which is varied in conformity with an exponential law. More particularly, the signal depends upon an operating frequency band and a preset value of nonlinear distortions of the feed-current, the relationship being as follows:

$$T = \left(\frac{lg\,\omega_1}{lg\,\omega_0} - 1\right) \cdot \frac{100}{\delta}$$

where:

T is the time of varying the feed-current frequency within the operating frequency band (in sec.),
$\omega_1$ is the cyclic frequency of the upper limit of the operating frequency band (in c.),
$\omega_0$ is the cyclic frequency of the lower limit of the operating frequency band (in c.), and
$\delta$ is a value of nonlinear distortions of the feed-current (in percent).

DETAILED DESCRIPTION

The present invention relates to methods for geophysical exploration and, more particularly, to methods for geological surveying.

Methods of geological surveying are known in which continuous electromagnet frequency sounding is effected by varying a feed-current frequency timewise in conformity with a linear law.

A disadvantage of said methods is that they do not insure detail uniformity of surveying in depth and that they require considerable time for one sounding.

An object of the present invention is to provide a method for geological surveying which would insure detail uniformity of surveying in depth.

Another object of the invention is to provide a method for geological surveying which would make it possible to raise efficiency considerably and to reduce costs of surveying due to a reduction in time required for a sounding.

In accordance with the above and other objects of the invention, sounding is effected by varying feed-current frequency timewise in conformity with an exponential law.

Other objects and advantages of the present invention will become apparent from the following detailed description of an exemplary embodiment thereof.

The method of the invention consists in inducing an electromagnetic field in the ground with the aid of a sinusoidal feed-current, the frequency of said current being continuously varied in time within a preset operating frequency band in conformity with the exponential law:

$$\omega(t) = \omega_0 \left(1 + \frac{\delta}{100} t\right)$$

where:

$\omega(t)$ is the instantaneous cyclic frequency (in c.), and
$t$ is the instantaneous time (in seconds).

Variation of the feed-current frequency in time in conformity with an exponential law insures detail uniformity of surveying in depth, since the penetration of the electromagnetic field in depth depends upon the feed-current frequency and is determined by the value $e^{-kz}$, $z$ being the depth of the penetration of the current (in meters), and $k = \sqrt{i\omega\mu\sigma}$, where $\sigma$ is the earth conductivity (in ohm$^{-1}$.m$^{-1}$), $i = \sqrt{-1}$, $\mu = 4\pi \cdot 10^{-7}$, (in H./m.), and $\omega$ is the feed-current cyclic frequency (in c.).

Simultaneously with inducing the electromagnetic field, the feed-current force is measured.

The pick-up of the components of said field (pick-up signals), when sounding, is effected at a certain distance from the point of excitation, equaling three or four sounding depths.

Pick-up signals are registered simultaneously with cutting in the feed-current and continuously within the preset operating frequency. As a result, a continuous curve is recorded, which shows the dependence of the earth specific resistance upon the current frequency.

The operating band of the frequencies required for sounding depends upon geological tasks and electric parameters of the geological section, ranging normally from tens of cycles to tens of kilocycles.

Optimum time for varying the feed-current frequency is selected, depending upon the operating frequency band width and a preset value of nonlinear distortions of the feed-current, the relationship being as follows:

$$T = \left(\frac{lg\,\omega_1}{lg\,\omega_0} - 1\right) \cdot \frac{100}{\delta}$$

where:

T is the time of varying the feed-current frequency within the operating frequency band (in sec.),
$\omega_1$ is the cyclic frequency of the upper limit of the operating frequency band (in c.),
$\omega_0$ is the cyclic frequency of the lower limit of the operating frequency band (in c.), and
$\delta$ is a value of nonlinear distortions of feed-current (in percent).

The method of the invention insures the detail uniformity of surveying and a considerable increase in its efficiency.

Apparatus for performing the method of the invention is illustrated in copending applications 637,689 and 638,203.

In the drawing is diagrammatically illustrated an apparatus for practicing the above method for determining the characteristics of a section S of a geological structure such as a volume of earth. A transmitting electrode TE transmits a signal into the ground, which signal is generated by a generator G under the control of a modulator M. The signal conveyed into the ground by the transmitting electrode TE is received by a receiving electrode RE and a receiver R is provided which receives the modulated signal direct from the generator G and also from the receiving electrode RE. A comparison made in the receiver R will enable a determination of the characteristics of the geological structure traverse by the signal.

Although the present invention has been described with reference to an exemplary embodiment thereof, it is apparent that various alterations and modifications may take place without departing from the spirit and scope of the invention, as those skilled in the art will easily understand.

These alterations and modifications are to be considered as falling within the essence and scope of the invention as defined in the appended claims.

What is claimed is:

1. A method of geological surveying by continuous electromagnetic frequency sounding, comprising: inducing a feed current signal into the ground; continuously varying the frequency of the feed current signal with time in conformity with an exponential law; and continuously picking up and registering the signal induced into the ground as the frequency is varied to provide an indication of a geological characteristic at different depths: the exponential law being $$w(t) = \omega_0 \left(1 + \frac{\delta}{100} t\right)$$

and the time of varying the feed current frequency being dependent upon an operating frequency band and a preset value of nonlinear distortions of the feed current in accordance with the relationship $$T = \left(\frac{\lg \omega_1}{\lg \omega_0} - 1\right)$$

wherein:

$w(t)$ is the instantaneous cyclic frequency (in c.); $t$ is the instantaneous time in seconds;

$T$ is the time of varying the feed current frequency within the operating frequency band (in sec.), $\omega_1$ is the cyclic frequency of the upper limit of the operating frequency band (in c.), $\omega_0$ is the cyclic frequency of the lower limit of the operating frequency band (in c.), and $\delta$ is a value of nonlinear distortions of the feed current (in percent).

References Cited

UNITED STATES PATENTS

| | | | |
|---|---|---|---|
| 1,718,352 | 6/1929 | Guilford | 324—6 |
| 1,843,407 | 2/1932 | Sundberg | 324—6 |
| 2,581,349 | 1/1952 | Barret | 324—6 |
| 2,731,596 | 1/1956 | Wait et al. | 324—6 |
| 2,766,421 | 10/1956 | Wait et al. | 324—1 |

GERARD R. STRECKER, Primary Examiner